(12) United States Patent
Yang et al.

(10) Patent No.: US 9,407,182 B2
(45) Date of Patent: Aug. 2, 2016

(54) SENSORLESS CONTROL METHOD AND SYSTEM FOR MOTOR

(71) Applicants: Hyundai Motor Company, Seoul (KR); Postech Academy-Industry Foundation, Pohang, Gyeongsangbuk-Do (KR)

(72) Inventors: Jaesik Yang, Bucheon (KR); Sungwon Kim, Gyeonggi-Do (KR); Kitae Yeom, Seoul (KR); Taewon Hwang, Seoul (KR); Junwoo Kim, Gyeongsangbuk-Do (KR); Kwang-Hee Nam, Gyeongsangbuk-Do (KR)

(73) Assignees: Hyundai Motor Company, Seoul (KR); Postech Academy-Industry Foundation, Pohang, Gyeongsangbuk-do (KR)

( * ) Notice: Subject to any disclaimer, the term of this patent is extended or adjusted under 35 U.S.C. 154(b) by 72 days.

(21) Appl. No.: 14/557,277

(22) Filed: Dec. 1, 2014

(65) Prior Publication Data

US 2016/0099667 A1 Apr. 7, 2016

(30) Foreign Application Priority Data

Oct. 1, 2014 (KR) .................. 10-2014-0132596

(51) Int. Cl.
*H02P 6/18* (2016.01)
(52) U.S. Cl.
CPC ...................... *H02P 6/182* (2013.01)
(58) Field of Classification Search
CPC ............. H02P 1/04; H02P 21/14; H02P 21/00
USPC ............. 318/400.01, 400.02, 400.07, 400.14, 318/400.15, 400.31, 400.32, 400.33, 318/400.34, 400.38, 700, 701, 715, 721, 318/779, 799, 800, 801, 430, 432, 434; 388/811, 833, 902, 911, 928.1
See application file for complete search history.

(56) References Cited

U.S. PATENT DOCUMENTS 5,973,474 A 10/1999 Yamamoto
8,340,848 B2 * 12/2012 Son .................. H02P 21/141
318/400.04

(Continued)

FOREIGN PATENT DOCUMENTS

JP 4350676 B2 10/2009
JP 4574412 B2 11/2010

(Continued)

*Primary Examiner* — Antony M Paul
(74) *Attorney, Agent, or Firm* — Mintz Levin Cohn Ferris Glovsky and Popeo, P.C.; Peter F. Corless

(57) ABSTRACT

A sensorless control method and system for a motor are provided. The includes a back EMF observer that is configured to estimate a back EMF of the motor and an angle error calculator that is configured to calculate an electrical angle error considering iron loss of the motor based on the back EMF estimated by the back EMF observer. An angle error compensator is configured to compensate the electrical angle error calculated by the angle error calculator. An electrical angle for compensating the calculated electrical angle error is obtained through simulation or experiment for the motor. In addition, a PLL controller is configured to receive the compensated electrical angle to estimate an actual angle by reducing the electrical angle error due to the iron loss, and to operate the motor based on the estimated actual angle.

7 Claims, 10 Drawing Sheets

(56) References Cited

U.S. PATENT DOCUMENTS 8,988,027 B2 * 3/2015 Fukumaru ........... H02P 21/0039
                                                        318/400.02
9,106,177 B2 * 8/2015 Son ........................ H02P 21/13

FOREIGN PATENT DOCUMENTS

| JP | 2012-166776 A | 9/2012 |
| KR | 10-2012-0054190 A | 5/2012 |

* cited by examiner

RELATED ART

SENSORLESS CONTROL METHOD AND SYSTEM FOR MOTOR

CROSS-REFERENCE TO RELATED APPLICATION

This application claims priority to and the benefit of Korean Patent Application No. 10-2014-0132596 filed in the Korean Intellectual Property Office on Oct. 1, 2014, the entire contents of which are incorporated herein by reference.

BACKGROUND (a) Field of the Invention

The present invention relates to a sensorless control method and system for a motor, and more particularly, to a sensorless control method and system for a motor that may more stably perform sensorless control in an ultra-high-speed driving region of a motor by adding a control model that considers iron loss of the motor to a back electromotive force (back EMF) observer and obtaining a more accurate electrical angle error that considers the iron loss through the control model.

(b) Description of the Related Art

As is well known to a person of ordinary skill in the art, a motor applied to an electrical turbocharger is a substantially small motor and thus it may be influenced by characteristic loss thereof. Generally, a permanent magnet motor may be operated without considering iron loss thereof. However, since such iron loss increases in proportion to speed of a motor, it is necessary to consider iron loss thereof when the motor is operated in an ultra-high-speed driving region (e.g., when a vehicle is travel at speed greater than a predetermined speed). Accordingly, it is required to operate an ultra-high-speed motor based on a control model considering iron loss.

Meanwhile, though it is required to accurately detect a position of a rotor of a motor while operating the motor, a sensor which may be configured to detect the position of the rotor in an ultra-high-speed region of the motor are not commercially available sensors. Accordingly, a sensorless control which does not use a sensor configured to detect the position of the rotor is required to operate the motor based on a control model therefor in a high-speed region thereof. However, since a sensorless control method for a motor according to the related art uses a control model that does not consider iron loss of the motor, an estimated electrical angle may become more inaccurate as speed of the motor increases causing a potential uncontrollable situation.

Referring to FIG. 1 illustrating a controller for a typical permanent magnet electric motor, a sensorless control method for the typical permanent magnet electric motor based on the back EMF observes the back EMF using an estimated d-axis and q-axis voltage commands and measured currents to obtain an electrical angle error. A phase-locked loop (PLL) controller is used to reduce the obtained electrical angle error. Estimated speed and electrical angle information may be obtained from output of the phase-locked loop controller, and may be used in a vector control of the motor.

To obtain the accurate electrical angle error, it is necessary to observe the back EMF, and the observation of the back EMF may be obtained from a motor control model. Generally, a motor control model not considering iron loss has been used, which may not be suitable for controlling an ultra-high-speed motor at which substantial iron loss occurs. Thus, the sensorless control not considering iron loss may cause a substantial electrical angle error in operating the ultra-high-speed motor.

The above information disclosed in this section is merely for enhancement of understanding of the background of the invention and therefore it may contain information that does not form the prior art that is already known in this country to a person of ordinary skill in the art.

SUMMARY

Accordingly, the present invention provides a sensorless control system for a motor that may more stably perform sensorless control in a ultra-high-speed driving region (e.g., about 50,000 rpm or greater) of a motor by adding a control model that considers iron loss of the motor to a back electromotive force (back EMF) observer and by obtaining a more accurate electrical angle error that considers the iron loss through the control model.

Further, the present invention provides a sensorless control method for a motor in which iron loss of a motor may be considered by a back EMF observer and which may compensate an back EMF of the motor based on the considered iron loss, calculate an accurate electrical angle error using the compensated back EMF, and then use the more accurate electrical angle error in control of the motor.

An exemplary embodiment of the present invention provides a sensorless control system controlling a motor which includes a permanent magnet motor which may include: a back EMF observer configured to estimate a back EMF of the motor; an angle error calculator configured to calculate an electrical angle error considering iron loss of the motor based on the back EMF estimated by the back EMF observer; an angle error compensator configured to compensate the electrical angle error calculated by the angle error calculator, wherein an electrical angle for compensating the calculated electrical angle error may be obtained through simulation or experiment for the motor; and a PLL controller configured to receive the compensated electrical angle to estimate an actual angle by reducing the electrical angle error due to the iron loss, and operate the motor based on the estimated actual angle.

The voltages ($v_\gamma$, $v_\delta$) of the motor associated with the electrical angle error ($\zeta$) considering the iron loss may be calculated by the following equation.

$$\begin{bmatrix} v_\gamma \\ v_\delta \end{bmatrix} = \begin{bmatrix} R_s + pL_d & -\omega_e L_q \\ \omega_e L_q & R_s + pL_d \end{bmatrix} \begin{bmatrix} i_\gamma \\ i_\delta \end{bmatrix} + \begin{bmatrix} -\sqrt{A^2+B^2}\sin(\Delta\theta+\zeta) \\ \sqrt{A^2+B^2}\cos(\Delta\theta+\zeta) \end{bmatrix}$$

$$\zeta = \tan^{-1}\left(\frac{B}{A}\right)$$

$$A = E_{ex} + \frac{\omega_e^2 L_d L_q}{R_i} i_q$$

$$B = -\frac{\omega_e^2 L_q(\psi m + L_d i_d)}{R_i}$$

d, q: accurate d, q-axis
$\omega_e$: electric angular velocity of motor
$i_d$: d-axis current
$i_q$: q-axis current
$i_{di}$: d-axis iron loss current
$i_{qi}$: q-axis iron loss current
$i_{dm}$: d-axis magnetizing current
$i_{qm}$: q-axis magnetizing current
$v_d$: d-axis voltage
$v_q$: q-axis voltage
$R_s$: stator phase resistance $R_i$: Iron loss equivalent resistance
$L_d$: d-axis inductance
$L_q$: q-axis inductance
$\psi_m$: permanent magnet flux constant
$P_{iron}$: Iron loss
$P_h$: hysteresis loss
$P_{ed}$: eddy-current loss The back EMFs ($e'_\gamma$, $e'_\delta$) output from the back EMF observer may be calculated by the following equation.

$$\begin{bmatrix} v_\gamma \\ v_\delta \end{bmatrix} = \begin{bmatrix} R_s + pL_d & -\omega_e L_q \\ \omega_e L_q & R_s + pL_d \end{bmatrix} \begin{bmatrix} i_\gamma \\ i_\delta \end{bmatrix} + \begin{bmatrix} -\sqrt{A^2 + B^2} \sin(\Delta\theta + \zeta) \\ \sqrt{A^2 + B^2} \cos(\Delta\theta + \zeta) \end{bmatrix}$$

$$\zeta = \tan^{-1}\left(\frac{B}{A}\right)$$

$$A = E_{ex} + \frac{\omega_e^2 L_d L_q}{R_i} i_q$$

$$B = -\frac{\omega_e^2 L_q (\psi m + L_d i_d)}{R_i}$$

Another exemplary embodiment of the present invention provides a sensorless control method for a motor performed by a sensorless controller which includes a back electromotive force (EMF) observer and a phase locked loop (PLL) controller which may include: estimating a back EMF of the motor using the back EMF observer; calculating an electrical angle error considering iron loss of the motor based on the estimated back EMF; and compensating the calculated electrical angle error, inputting the compensated electrical angle error to the PLL controller to estimate an actual angle by reducing the error angle due to the iron loss in the PLL controller, and operating the motor based on the estimated actual angle, wherein voltages ($v_\gamma$, $v_\delta$) of the motor associated with the electrical angle error ($\zeta$) considering the iron loss is calculated by the following equation.

$$e'_\gamma = -\sqrt{A^2 + B^2} \sin(\Delta\theta + \zeta), \quad \Delta\theta + \zeta = \tan^{-1}\left(\frac{-e'_\gamma}{e'_\delta}\right)$$
$$e'_\delta = -\sqrt{A^2 + B^2} \sin(\Delta\theta + \zeta)$$

$$\zeta = \tan^{-1}\left(\frac{B}{A}\right)$$

$$A = E_{ex} + \frac{\omega_e^2 L_d L_q}{R_i} i_q$$

$$B = -\frac{\omega_e^2 L_q (\psi m + L_d i_d)}{R_i}$$

d, q: accurate d, q-axis
$\omega_e$: electric angular velocity of motor
$i_d$: d-axis current
$i_q$: q-axis current
$i_{di}$: d-axis iron loss current
$i_{qi}$: q-axis iron loss current
$i_{dm}$: d-axis magnetizing current
$i_{qm}$: q-axis magnetizing current
$v_d$: d-axis voltage
$v_q$: q-axis voltage
$R_s$: stator phase resistance
$R_i$: Iron loss equivalent resistance
$L_d$: d-axis inductance
$L_q$: q-axis inductance
$\psi_m$: permanent magnet flux constant
$P_{iron}$: Iron loss
$P_h$: hysteresis loss
$P_{ed}$: eddy-current loss The electrical angle for compensating the electrical angle error may be obtained through simulation or experiment for the motor.

As described above, according to an exemplary embodiment of the present invention, it may be possible to more stably perform sensorless control in an ultra-high-speed driving region of a motor by adding a control model that takes into consideration iron loss of the motor to a back electromotive force (back EMF) observer and obtaining a more accurate electrical angle error considering the iron loss through the control model.

According to an exemplary embodiment of the present invention, it may be possible to consider iron loss of a motor by a back EMF observer, to compensate an EMF of the motor based on the considered iron loss, to calculate an accurate electrical angle error using the compensated EMF, and then to use the accurate electrical angle error to operate the motor.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

Figure 1:
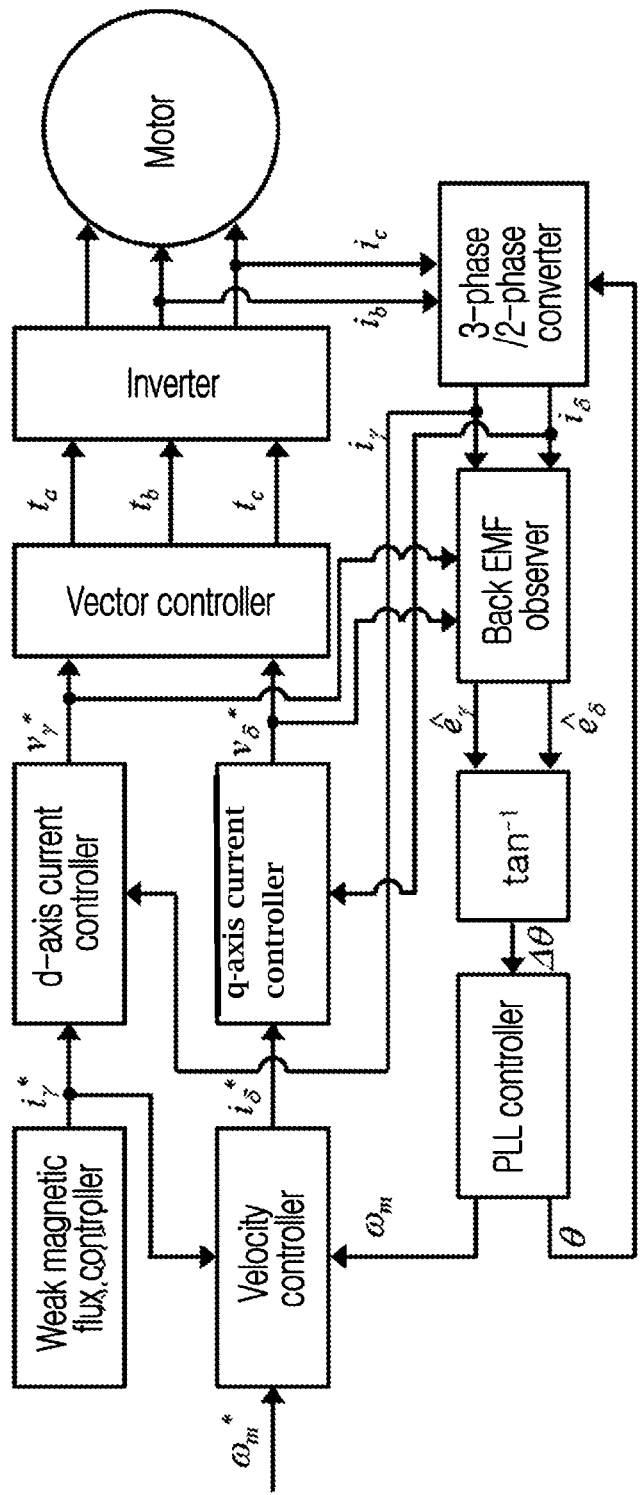
FIG. 1 is an exemplary schematic diagram illustrating a controller for controlling a typical permanent magnet motor according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

Figure 2:
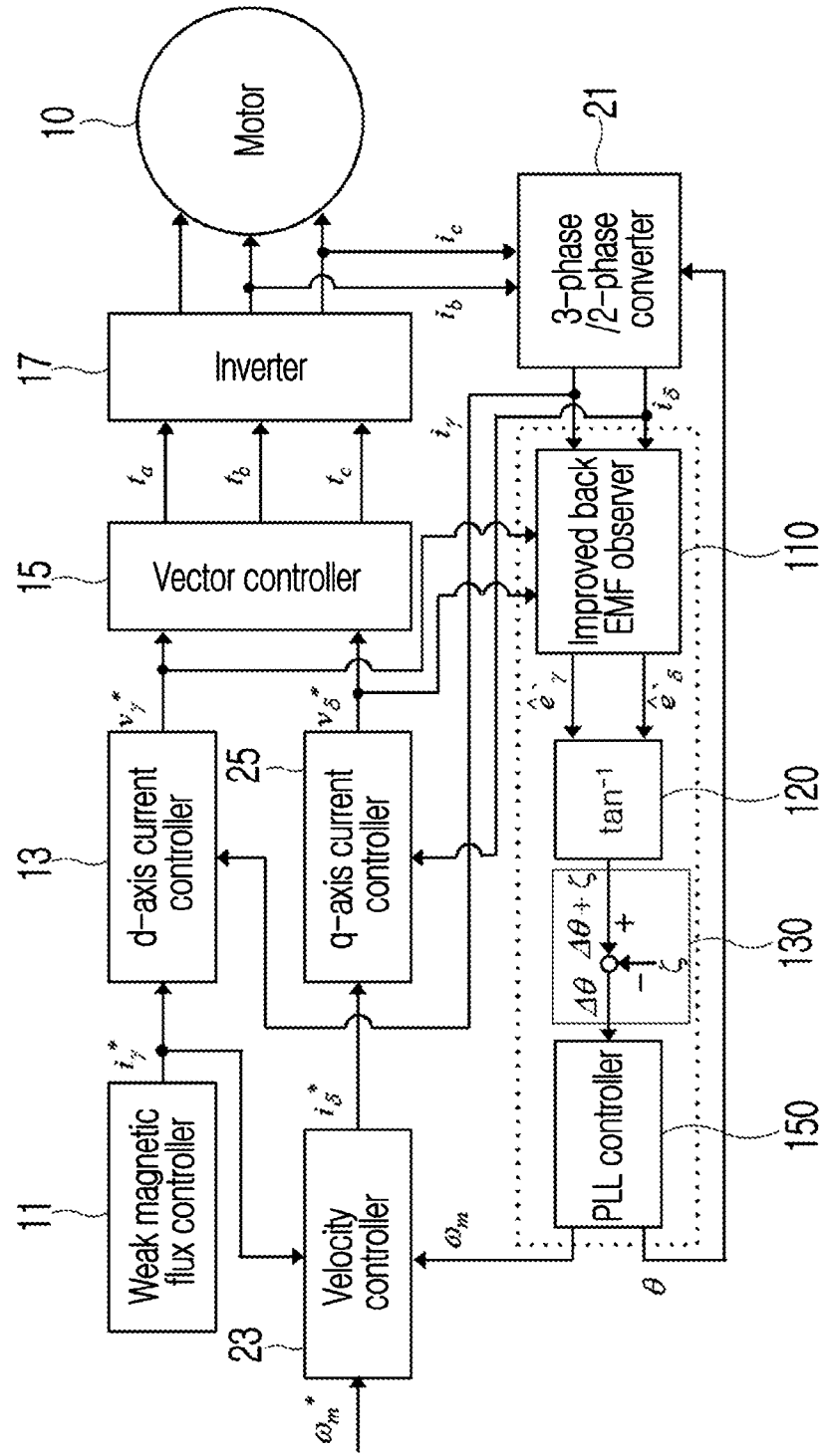
FIG. 2 is an exemplary diagram illustrating a sensorless control system for controlling a motor according to an exemplary embodiment of the present invention.

FIG. 2 is an exemplary diagram illustrating a sensorless control system for controlling a motor according to an exemplary embodiment of the present invention. Referring to FIG. 2, a sensorless control system for controlling a (permanent magnet) motor according to an exemplary embodiment of the present invention may include: a back EMF observer 110 configured to estimate a back EMF of a motor 10; an angle error calculator 120 configured to calculate an electrical angle error considering iron loss of the motor 10 based on the back EMF estimated by the back EMF observer 110; an angle error compensator 130 configured to compensate the electrical angle error calculated by the angle error calculator 120, wherein an electrical angle for compensating the calculated electrical angle error may be obtained through simulation or experiment for the motor 10; and a PLL controller 150 configured to receive the compensated electrical angle to estimate an actual angle by reducing the electrical angle error due to the iron loss, and operate the motor 10 based on the estimated actual angle.

An electrical compensation angle input to the angle error compensator 130 and used to compensate the electrical angle error may be obtained through simulation or experiment for the motor 10. Symbols denoted in FIG. 2 are referred to as definition as follows:

γ, δ: estimated d-axis, q-axis $\omega_m^*$: mechanical angular velocity command value of motor $\omega_m$: estimated mechanical angular velocity of motor (sensorless control result value thereof)

$\theta$: estimated electrical angular velocity (sensorless control result value thereof)

$\Delta\theta$: electrical angular velocity error $i_\gamma^*$: estimated d-axis current command value $i_\delta^*$: estimated q-axis current command value $i_\gamma$: estimated measured d-axis current (current measured by 3-phase/2-phase converter after current sensor)

$i_\delta$: estimated measured d-axis current (current measured by 3-phase/2-phase converter after current sensor)

$v_\gamma^*$: estimated d-axis voltage command value $v_\delta^*$: estimated q-axis voltage command value $t_a, t_b, t_c$: PWM ON times for a, b, c phases $i_b, i_c$: currents for b, c phases (or, it is allowable to measure any 2-phase currents among the 3-phase currents.)

$\hat{e}_\gamma$: extended estimated d-axis EMF value (result of observer)

$\hat{e}_\delta$: extended estimated q-axis EMF value (result of observer)

In the exemplary embodiment of the present invention, the motor 10 may be a permanent magnet electric motor such as an ultra-high-speed motor (e.g., having a speed of about 50,000 rpm or greater) applied to at least one of an electrical turbocharger, an electrical supercharger, an air-blower of a fuel cell system, and a ultra-high-speed motor system, but it should be understood that the scope of the present invention is not limited thereto.

The sensorless control system according to the exemplary embodiment of the present invention may include the back EMF observer 110, the angle error calculator 120, the angle error compensator 130, and the PLL controller 150, as well as a weak magnetic flux controller 11, a d-axis current controller 13, a vector controller 15, an inverter 17, a velocity controller 23, a q-axis current controller 25, and a 3-phase/2-phase converter 21 as shown in FIG. 1 illustrating the controller configured to operate the typical permanent magnet motor. In various exemplary embodiments of the present invention, the weak magnetic flux controller 11, the d-axis current controller 13, the vector controller 15, the inverter 17, the velocity controller 23, the q-axis current controller 25, and/or the 3-phase/2-phase converter 21 may be the same as or similar to those used in the related art, and thus a detailed description thereof will be omitted.

Figure 5:
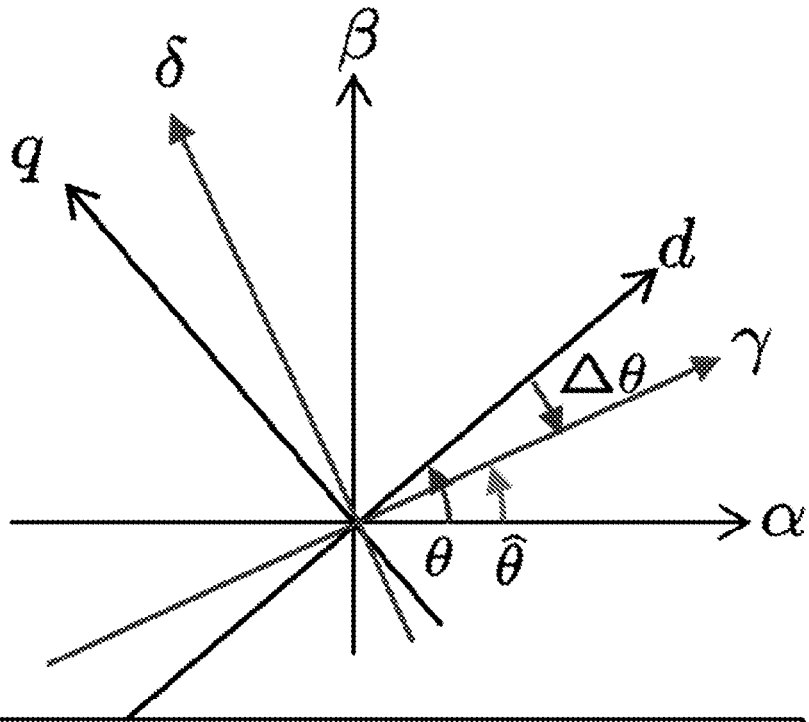
FIG. 5 is an exemplary graph illustrating a voltage equation for controlling a motor according to an exemplary embodiment of the present invention.

Referring to FIG. 5, for a sensorless control method for a typical permanent magnet motor, more accurate d-axis and q-axis voltages for a motor may be calculated by the following voltage equation.

$$\begin{bmatrix} v_d \\ v_q \end{bmatrix} = \begin{bmatrix} R_s + pL_d & -\omega_e L_q \\ \omega_e L_q & R_s + pL_d \end{bmatrix} \begin{bmatrix} i_d \\ i_q \end{bmatrix} + \begin{bmatrix} 0 \\ \omega_e \psi_m \end{bmatrix}$$

Since a d-axis and a q-axis that correspond to an x-axis and a y-axis of an accurate rotary coordinate system may be unknown, the above voltage equation may be analyzed in a γ-axis and a δ-axis that respectively estimate the d-axis and the q-axis. Accordingly, when a rotary conversion by electrical angle error ($\Delta\theta=\theta-\hat{\theta}$) is performed, the above voltage equation may be changed as the following equation.

$$\begin{bmatrix} v_\gamma \\ v_\delta \end{bmatrix} = \begin{bmatrix} R_s + pL_d & -\omega_e L_q \\ \omega_e L_q & R_s + pL_d \end{bmatrix} \begin{bmatrix} i_\gamma \\ i_\delta \end{bmatrix} + \begin{bmatrix} -E_{ex}\sin\Delta\theta \\ E_{ex}\cos\Delta\theta \end{bmatrix}$$

$$E_{ex} = \omega_e\{(L_d - L_q)i_d + \psi_m\} \qquad 5$$

The second term of the right side of the changed voltage equation corresponds to an extended back EMF of the motor, and includes information for an electrical angle error. When the extended back EMF is estimated using the following equation, an electrical angle error may be obtained using an arctangent function as the following equation.

$$\begin{bmatrix} e_\gamma \\ e_\delta \end{bmatrix} = \begin{bmatrix} -E_{ex}\sin\Delta\theta \\ E_{ex}\cos\Delta\theta \end{bmatrix} = \begin{bmatrix} v_\gamma \\ v_\delta \end{bmatrix} - \begin{bmatrix} R_s + pL_d & -\omega_e L_q \\ \omega_e L_q & R_s + pL_d \end{bmatrix} \begin{bmatrix} i_\gamma \\ i_\delta \end{bmatrix}$$

$$\Delta\theta = \tan^{-1}\left(\frac{-e_\gamma}{e_\delta}\right)$$

$e_\gamma$: γ-axis extended back EMF
$e_\delta$: δ-axis extended back EMF

Figure 6:
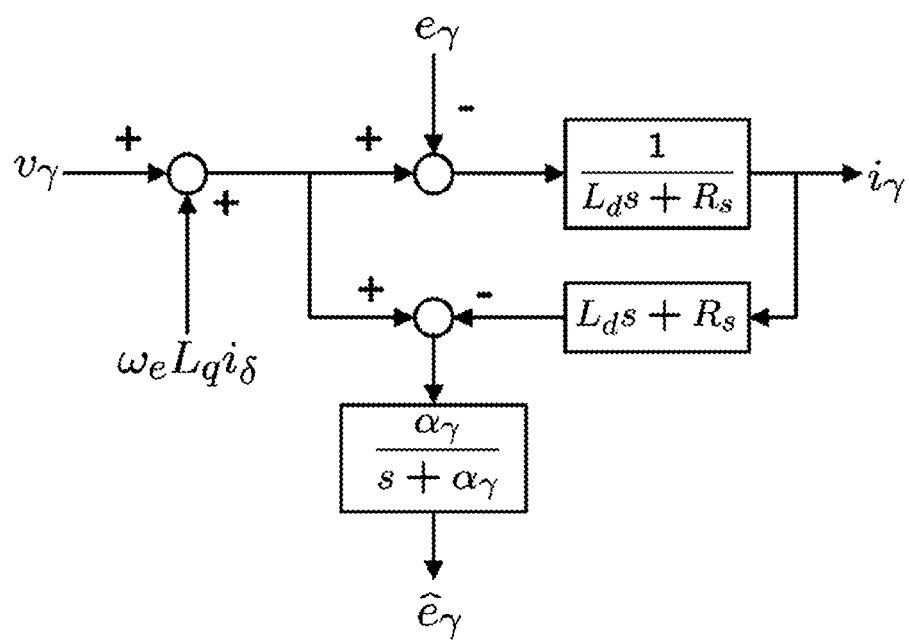
FIG. 6 is an exemplary diagram illustrating an internal logic of a typical back EMF observer according to the related art.

A disturbance type of extended back EMF may be used to observe an extended back EMF. A γ-axis extended back EMF observer and a δ-axis extended back EMF observer may be configured as shown in FIG. 6, which will be apparent to a person of ordinary skill in the art.

Figure 3:
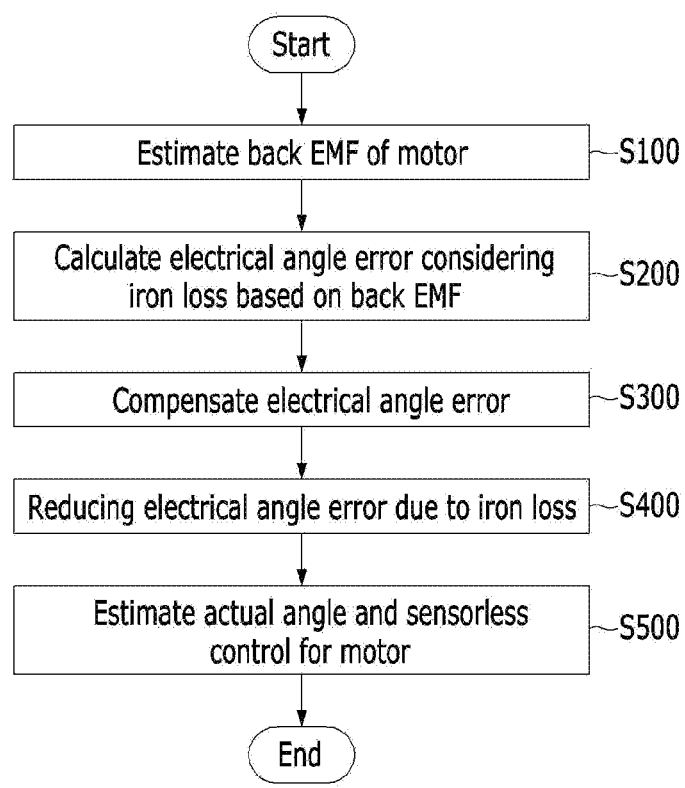
FIG. 3 is an exemplary flowchart showing a sensorless control method for controlling a motor according to an exemplary embodiment of the present invention.

A sensorless control method for controlling a permanent magnet motor will now be described in detail with reference to the accompanying drawings. FIG. 3 is an exemplary flowchart showing a sensorless control method for controlling a permanent magnet motor according to an exemplary embodiment of the present invention. As shown in FIG. 3, the back EMF observer 110 may be configured to estimate a back EMF of the motor 10 (S100), and the angle error calculator 120 may be configured to calculate an electrical angle error) (Δθ+ζ) due to iron loss of the motor 10 (S200).

The electrical angle error (Δθ+ζ) includes an electrical angle error (Δθ; FIG. 1) according to the related art and an error (ζ) considering iron loss of the motor 10. Accordingly, the sensorless control method according to the exemplary embodiment of the present invention may be configured to compensate the error (ζ) using the angle error compensator 130 before the electrical angle error (Δθ+ζ) is input to the PLL controller 150 (S300).

The electrical angle for compensating the error (ζ) may be obtained through simulation or experiment to be applied to the angle error compensator 130. When the error (ζ) considering iron loss is compensated by the angle error compensator 130, the PLL controller 150 may be configured to estimate an actual angle of the motor 10 to reduce the electrical angle error (S400), and then operate the motor 10 in an ultra-high speed region using the estimated actual angle (S500).

Figure 4:
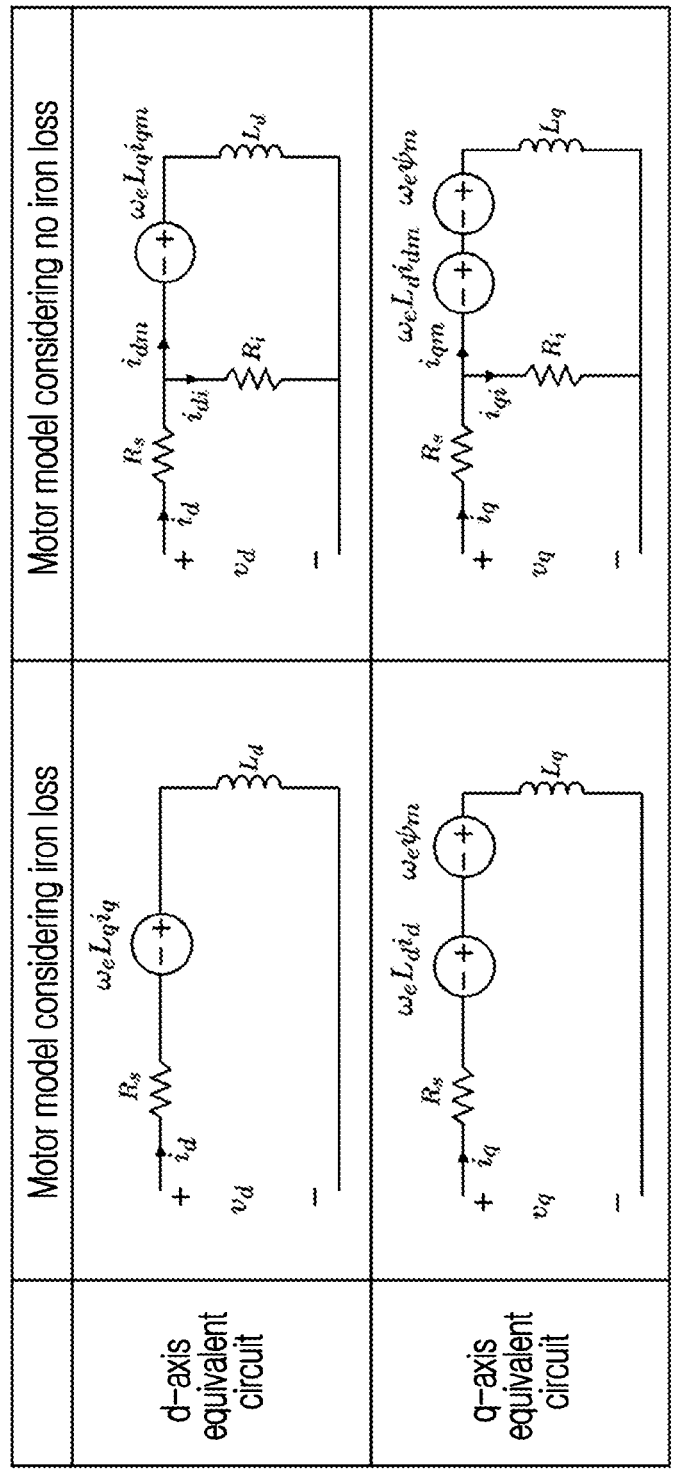
FIG. 4 is an exemplary table drawing for comparing a control model for a motor considering iron loss with a control model therefor not considering iron loss according to an exemplary embodiment of the present invention.

FIG. 4 is an exemplary table drawing comparing a control model for a motor considering iron loss with a control model not considering iron loss. The control model for the motor 10 considering iron loss is based on an exemplary embodiment of the present invention, and the control model not considering iron loss is based on the related art. Symbols denoted in FIG. 4 are referred to with definition as follows.

d, q: accurate d, q-axis
$\omega_e$: electric angular velocity of motor
$i_d$: d-axis current
$i_q$: q-axis current
$i_{di}$: d-axis iron loss current
$i_{qi}$: q-axis iron loss current
$i_{dm}$: d-axis magnetizing current
$i_{qm}$: q-axis magnetizing current
$v_d$: d-axis voltage
$v_q$: q-axis voltage
$R_s$: stator phase resistance
$R_i$: Iron loss equivalent resistance
$L_d$: d-axis inductance
$L_q$: q-axis inductance
$\psi_m$: permanent magnet flux constant
$P_{iron}$: Iron loss
$P_h$: hysteresis loss
$P_{ed}$: eddy-current loss Influence on iron loss of a conventional motor may be researched to detect influence on iron loss of the motor 10 according to the exemplary embodiment of the present invention. FIG. 4 is an exemplary drawing illustrating d-axis and q-axis models of a motor not considering iron loss and d-axis and q-axis models considering iron loss. As shown in FIG. 4, resistance of a resistor $R_i$ is equivalent to iron loss, and the resistor $R_i$ may be connected in parallel to an inductor of the motor. Therefore, a motor control model considering iron loss is different from a motor control model not considering iron loss, and thus, a sensorless control method based on the motor control model not considering iron loss may not be able to measure an accurate angle for operating the motor.

$$P_{iron} = P_h + P_{ed}$$

Iron loss ($P_{iron}$) may respectively be divided into hysteresis loss ($P_h$) and eddy current loss ($P_{ed}$). The hysteresis loss may be proportional to frequency of the current applied to the motor, and the eddy current loss may be proportional to the square thereof. Since a frequency applied to the ultra-high-speed motor may be twice or more greater than a frequency applied to a typical high-speed motor, iron loss of the ultra-high-speed motor may be four times or greater than iron loss of the typical high-speed motor. Accordingly, to operate the ultra-high-speed motor, iron loss may be considered as the exemplary embodiment of the present invention.

FIG. 5 is an exemplary graph illustrating a voltage equation of a motor in an ordinary axis and an inclined axis. The voltage equation of the motor with respect to the ordinary axis according to the related art may be the following equation (a), and the voltage equation of the motor considering iron loss with respect to the ordinary axis according to the exemplary embodiment of the present invention may be the following equation (b).

$$\begin{bmatrix} v_d \\ v_q \end{bmatrix} = \begin{bmatrix} R_s + pL_d & -\omega_e L_q \\ \omega_e L_q & R_s + pL_d \end{bmatrix} \begin{bmatrix} i_d \\ i_q \end{bmatrix} + \begin{bmatrix} 0 \\ \omega_e \psi_m \end{bmatrix} \quad \text{Equation (a)}$$

$$\begin{bmatrix} v_d \\ v_q \end{bmatrix} = \begin{bmatrix} R_s + \frac{\omega_e^2 L_d L_q}{R_i} + pL_d & -\omega_e L_q + p\frac{\omega_e L_d L_q}{R_i} \\ \omega_e L_d - p\frac{\omega_e L_d L_q}{R_i} & R_s + \frac{\omega_e^2 L_d L_q}{R_i} + pL_q \end{bmatrix} \begin{bmatrix} i_d \\ i_q \end{bmatrix} + \begin{bmatrix} \frac{w_e^2 L_q \psi_m}{R_i} \\ \omega_e \psi_m \end{bmatrix} \quad \text{Equation (b)}$$

According to whether iron loss of the motor 10 is considered, the voltage equations (a) and (b) are different from each other. Since a d-axis and a q-axis of the motor may be unknown, a γ-axis and a δ-axis that respectively estimate the d-axis and the q-axis may be used. Voltage equations of the motor with respect to the inclined axis may respectively be the following equations (c) and (d). The following equation (c) corresponds to the voltage equation of the motor not considering iron loss according to the related art, and the following equation (d) corresponds to the voltage equation of the motor considering iron loss according to the exemplary embodiment of the present invention.

$$\begin{bmatrix} v_\gamma \\ v_\delta \end{bmatrix} = \begin{bmatrix} R_s + pL_d & -\omega_e L_q \\ \omega_e L_q & R_s + pL_d \end{bmatrix} \begin{bmatrix} i_\gamma \\ i_\delta \end{bmatrix} + \begin{bmatrix} -E_{ex}\sin\Delta\theta \\ E_{ex}\cos\Delta\theta \end{bmatrix}$$ Equation (c)

$$\begin{bmatrix} v_\gamma \\ v_\delta \end{bmatrix} = \begin{bmatrix} R_s + pL_d & -\omega_e L_q \\ \omega_e L_q & R_s + pL_d \end{bmatrix}$$ Equation (d)

$$\begin{bmatrix} i_\gamma \\ i_\delta \end{bmatrix} + \begin{bmatrix} -\sqrt{A^2 + B^2}\sin(\Delta\theta + \zeta) \\ \sqrt{A^2 + B^2}\cos(\Delta\theta + \zeta) \end{bmatrix}$$

$$\zeta = \tan^{-1}\left(\frac{B}{A}\right)$$

$$A = E_{ex} + \frac{\omega_e^2 L_d L_q}{R_i} i_q$$

$$B = -\frac{\omega_e^2 L_q(\psi m + L_d i_d)}{R_i}$$

Referring to the equations (c) and (d), for considering iron loss, when a back EMF observer according to the related is used, an electrical angle error by the error ($\zeta$) may occur. The back EMF (refer to FIG. 1) output from the back EMF observer according to the related art may be expressed as the following equation (e), and the back EMF (refer to FIG. 2) output from the back EMF observer 110 according to the exemplary embodiment of the present invention is expressed as the following equation (f).

$$e_\gamma = -E_{ex}\sin\Delta\theta$$
$$e_\delta = E_{ex}\cos\Delta\theta \quad , \quad \Delta\theta = \tan^{-1}\left(\frac{-e_\gamma}{e_\delta}\right)$$ Equation (e)

$$e'_\gamma = -\sqrt{A^2 + B^2}\sin(\Delta\theta + \zeta)$$
$$e'_\delta = -\sqrt{A^2 + B^2}\cos(\Delta\theta + \zeta) \quad , \quad \Delta\theta + \zeta = \tan^{-1}\left(\frac{-e'_\gamma}{e'_\delta}\right)$$ Equation (f)

$$\zeta = \tan^{-1}\left(\frac{B}{A}\right)$$

$$A = E_{ex} + \frac{\omega_e^2 L_d L_q}{R_i} i_q$$

$$B = -\frac{\omega_e^2 L_q(\psi m + L_d i_d)}{R_i}$$

According to the exemplary embodiment of the present invention, when an electrical angle which may compensate the electrical angle error ($\zeta$) considering iron loss is obtained through simulation and/or experiment for the motor, the angle error compensator 130 may be configured to compensate the electrical angle error using the obtained electrical angle.

As described above, according to the exemplary embodiment of the present invention, it may be possible to achieve enhanced stability and efficiency, enlarged drivability, and improved performance for the motor. In other words, according to the exemplary embodiment of the present invention, it may be possible to more stably perform sensorless control in the ultra-high-speed driving region of the motor by adding the control model that considers iron loss of the motor to the back EMF observer and obtaining the more accurate electrical angle error considering the iron loss through the control model.

Further, according to the exemplary embodiment of the present invention, it may be possible to improve performance of the motor by considering iron loss of the motor through the back EMF observer, compensating the back EMF of the motor based on the considered iron loss, calculating the accurate electrical angle error using the compensated EMF, and using the more accurate electrical angle error in control of the motor. The exemplary embodiment of the present invention may have advantages as follows.

Stability: it may be possible to more stably operate a motor in an ultra-high-speed driving region of more than about 50,000 rpm by estimating a more accurate angle associated with driving of the motor.

Enhanced efficiency: it may be possible to reduce an electrical burden loaded on a motor by more efficiently using back EMF of the motor, to enhance efficiency of an ultra-high-speed motor system.

Enlarged drivability: it may be possible to drive a motor even in an ultra-high-speed driving region of more than about 100,000 rpm by more accurately calculating a driving angle of a motor. (It may be difficult to drive a motor in an ultra-high-speed driving region of more than about 50,000 rpm in the related art.)

Improved performance: it may be possible to improve efficiency of d-axis and q-axis current and voltage control based on more accurate angle information with respect to a motor, to improve torque and power performance of the motor.

Meanwhile, the exemplary embodiment of the present invention and the related art may be compared in performance with reference to FIGS. 7 to 10.

Figure 7:
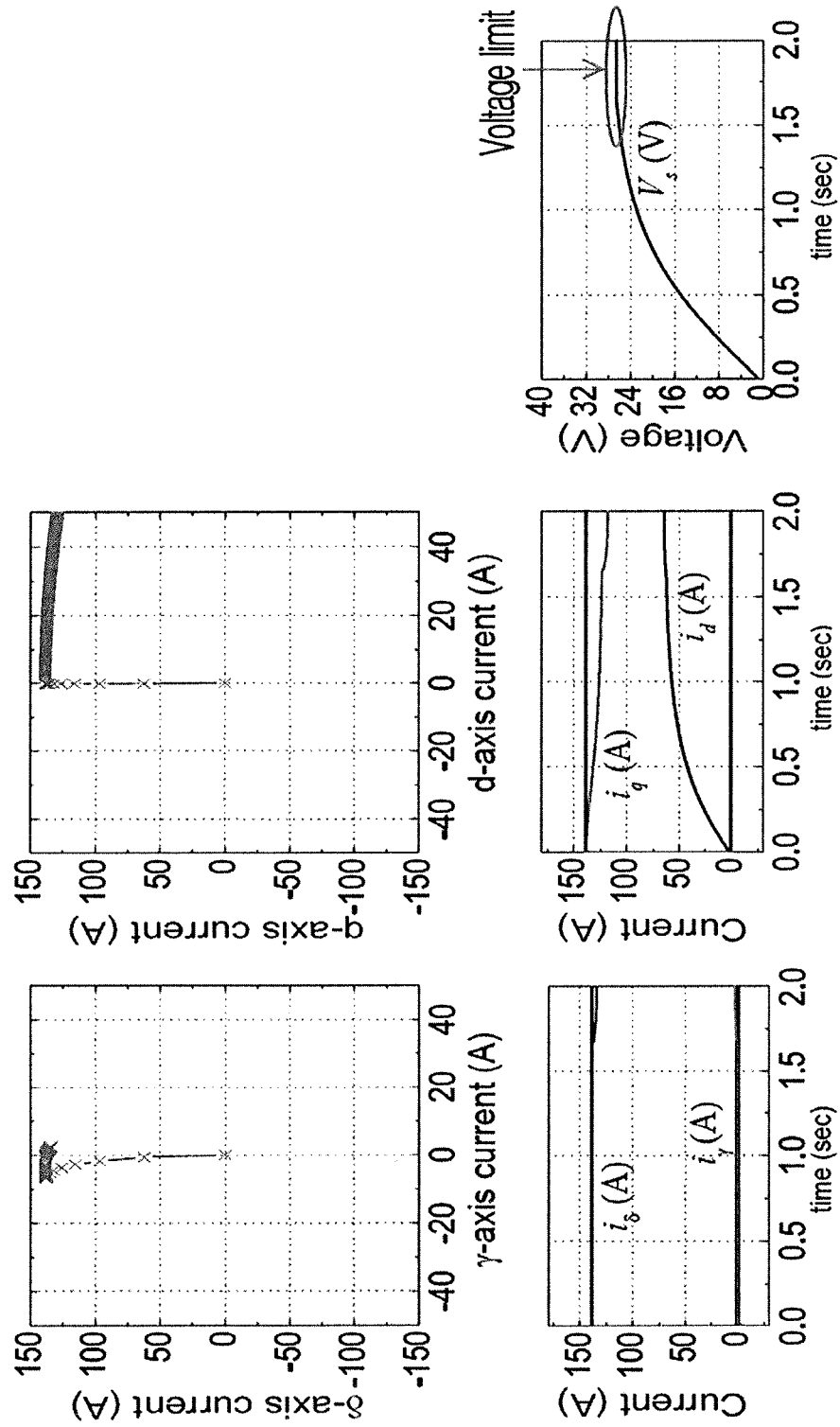
FIGS. 7 to 10 are exemplary graphs for comparing an exemplary embodiment of the present invention with the related art.

FIG. 7 is an exemplary graph illustrating measured current waveform when sensorless control for a motor based on an extended back EMF according to the related art is applied. Referring to FIG. 7, electrical angle difference between an estimated coordinate system and an actual rotary coordinate system increases closer to high-speed region due to the iron loss, and thus currents ($i_g$, $i_d$) in the estimated coordinate system and currents ($i_d$, $i_q$) in the actual rotary coordinate system differ. Accordingly, a voltage limit may occur when a positive current is applied to the d-axis of the actual rotary coordinate system, thus decreasing driving region for the motor.

Figure 8:
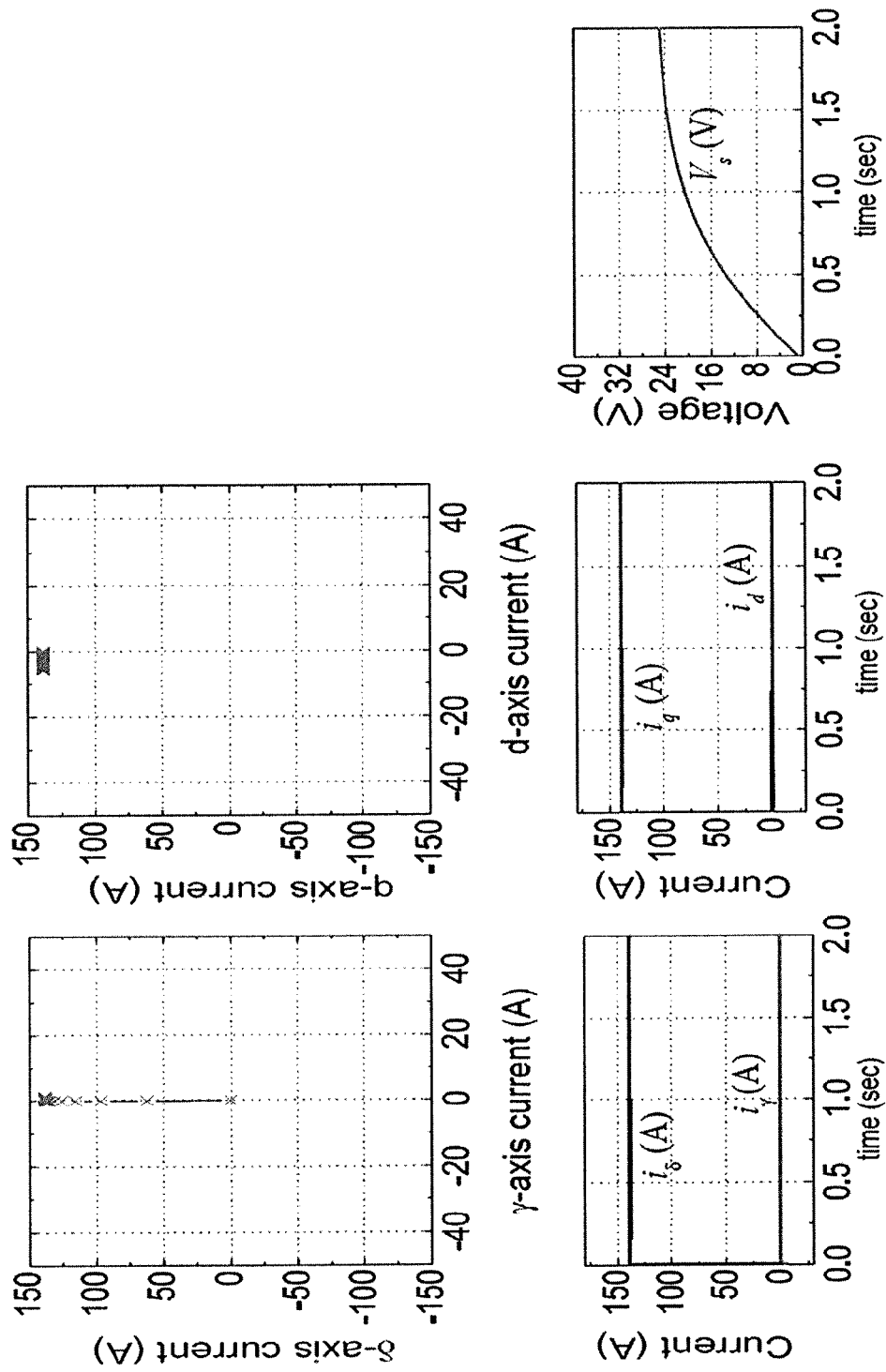

FIG. 8 an exemplary graph illustrating measured current waveform when sensorless control for a motor based on a back EMF according to an exemplary embodiment of the present invention is applied. Referring to FIG. 8, since an electrical angle error due to iron loss may be compensated, currents ($i_g$, $i_d$) in the estimated coordinate system and currents ($i_d$, $i_q$) in the actual rotary coordinate system may be substantially the same, and thus the motor may be operated even in the high-speed region.

Figure 9:
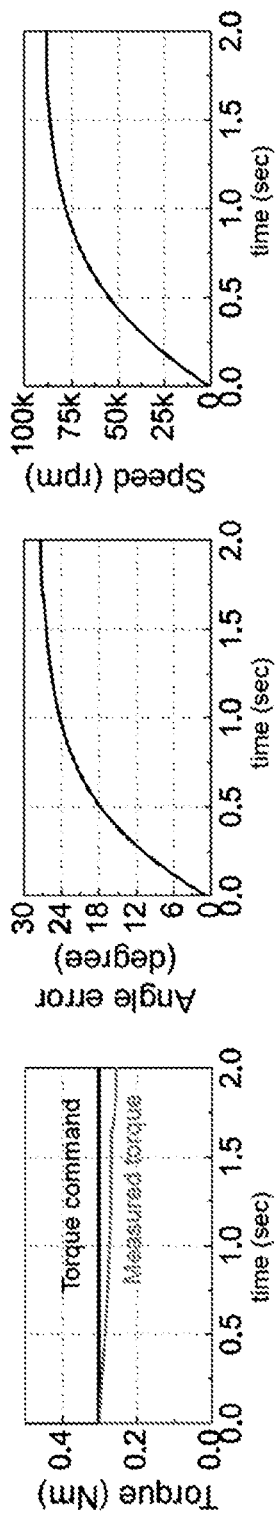

Referring to FIG. 9, electrical angle errors increase significantly closer to high-speed region due to iron loss when sensorless control for the motor based on the extended back EMF according to the related art is applied, and thus torque control may be not be smoothed and the driving region may be limited in the high-speed region.

Figure 10:
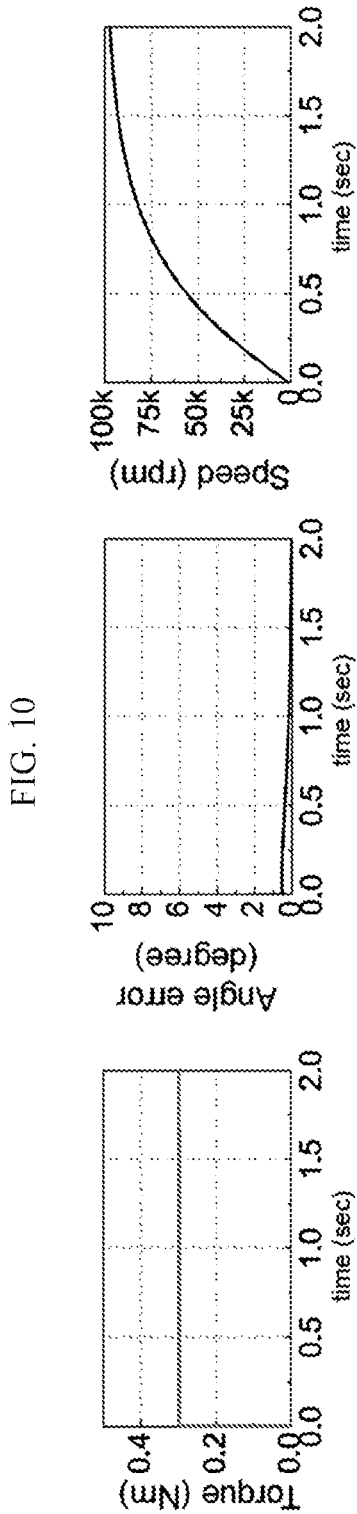

As shown in FIG. 10, according to an exemplary embodiment of the present invention, since electrical angle errors are minimal, torque control for the motor may be smoothed, thus increasing driving region therefor. Therefore, according to the exemplary embodiment of the present invention, it may be possible to drive and operate the motor even in an ultra-high-speed speed thereof.

While the exemplary embodiment has been described in connection with a permanent magnet motor for a turbocharger to be an exemplary embodiment, the exemplary embodiment may be applied to an ultra-high-speed motor for a micro-turbine generator, an ultra-high-speed motor for a circular compressor, an ultra-high-speed motor for a pump, and so on. While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

10: motor
110: back electromotive force (EMF) observer
120: angle error calculator
130: angle error compensator
150: phase locked loop (PLL) controller

What is claimed is:

1. A sensorless control system controlling a motor having a permanent magnet motor, comprising:
a back EMF observer configured to estimate a back EMF of the motor;
an angle error calculator configured to calculate an electrical angle error considering iron loss of the motor based on the back EMF estimated by the back EMF observer;
an angle error compensator configured to compensate the electrical angle error calculated by the angle error calculator, wherein an electrical angle for compensating the calculated electrical angle error is obtained through simulation or experiment for the motor; and
a PLL controller configured to receive the compensated electrical angle to estimate an actual angle by reducing the electrical angle error due to the iron loss, and operate the motor based on the estimated actual angle.

2. The sensorless control system of claim 1, wherein voltages ($v_\gamma$, $v_\delta$) of the motor associated with the electrical angle error ($\zeta$) considering the iron loss are calculated by the following equation:

$$\begin{bmatrix} v_\gamma \\ v_\delta \end{bmatrix} = \begin{bmatrix} R_s + pL_d & -\omega_e L_q \\ \omega_e L_q & R_s + pL_d \end{bmatrix} \begin{bmatrix} i_\gamma \\ i_\delta \end{bmatrix} + \begin{bmatrix} -\sqrt{A^2 + B^2} \sin(\Delta\theta + \zeta) \\ \sqrt{A^2 + B^2} \cos(\Delta\theta + \zeta) \end{bmatrix}$$

$$\zeta = \tan^{-1}\left(\frac{B}{A}\right)$$

$$A = E_{ex} + \frac{\omega_e^2 L_d L_q}{R_i} i_q$$

$$B = -\frac{\omega_e^2 L_q (\psi m + L_d i_d)}{R_i}$$

wherein, d, q: accurate d, q-axis; $\omega_e$: electric angular velocity of motor; $i_d$: d-axis current; $i_q$: q-axis current; $i_{di}$: d-axis iron loss current; $i_{qi}$: q-axis iron loss current; $i_{dm}$: d-axis magnetizing current; $i_{qm}$: q-axis magnetizing current; $v_d$: d-axis voltage; $v_q$: q-axis voltage; $R_s$: stator phase resistance; $R_i$: Iron loss equivalent resistance; $L_d$: d-axis inductance; $L_q$: q-axis inductance; $\psi_m$: permanent magnet flux constant; $P_{iron}$: Iron loss; $P_h$: hysteresis loss; and $P_{ed}$: eddy-current loss.

3. The sensorless control system of claim 2, wherein back EMFs ($e'_\gamma$, $e'_\delta$) output from the back EMF observer is calculated by the following equation:

$$e'_\gamma = -\sqrt{A^2 + B^2} \sin(\Delta\theta + \zeta)$$
$$e'_\delta = -\sqrt{A^2 + B^2} \cos(\Delta\theta + \zeta)$$ , $\Delta\theta + \zeta = \tan^{-1}\left(\frac{-e'_\gamma}{e'_\delta}\right)$ $$\zeta = \tan^{-1}\left(\frac{B}{A}\right)$$

$$A = E_{ex} + \frac{\omega_e^2 L_d L_q}{R_i} i_q$$

$$B = -\frac{\omega_e^2 L_q (\psi m + L_d i_d)}{R_i}.$$

4. A sensorless control method for a motor performed by a sensorless controller which includes a back electromotive force (EMF) observer and a phase locked loop (PLL) controller, comprising:
estimating, by the sensorless controller, a back EMF of the motor using the back EMF observer;
calculating, by the sensorless controller, an electrical angle error considering iron loss of the motor based on the estimated back EMF; and
compensating, by the sensorless controller, the calculated electrical angle error;
inputting, by the sensorless controller, the compensated electrical angle error to the PLL controller to estimate an actual angle by reducing the error angle due to the iron loss in the PLL controller, and to operate the motor based on the estimated actual angle,
wherein voltages ($v_\gamma$, $v_\delta$) of the motor associated with the electrical angle error ($\zeta$) considering the iron loss is calculated by the following equation $$\begin{bmatrix} v_\gamma \\ v_\delta \end{bmatrix} = \begin{bmatrix} R_s + pL_d & -\omega_e L_q \\ \omega_e L_q & R_s + pL_d \end{bmatrix} \begin{bmatrix} i_\gamma \\ i_\delta \end{bmatrix} + \begin{bmatrix} -\sqrt{A^2 + B^2} \sin(\Delta\theta + \zeta) \\ \sqrt{A^2 + B^2} \cos(\Delta\theta + \zeta) \end{bmatrix}$$

$$\zeta = \tan^{-1}\left(\frac{B}{A}\right)$$

$$A = E_{ex} + \frac{\omega_e^2 L_d L_q}{R_i} i_q$$

$$B = -\frac{\omega_e^2 L_q (\psi m + L_d i_d)}{R_i}$$

wherein d, q: accurate d, q-axis; $\omega_e$: electric angular velocity of motor; $i_d$: d-axis current; $i_q$: q-axis current; $i_{di}$: d-axis iron loss current; $i_{qi}$: q-axis iron loss current; $i_{dm}$: d-axis magnetizing current; $i_{qm}$: q-axis magnetizing current; $v_d$: d-axis voltage; $v_q$: q-axis voltage; $R_s$: stator phase resistance; $R_i$: Iron loss equivalent resistance; $L_d$: d-axis inductance; $L_q$: q-axis inductance; $\psi_m$: permanent magnet flux constant; $P_{iron}$: Iron loss; $P_h$: hysteresis loss; and $P_{ed}$: eddy-current loss.

5. The sensorless control method of claim 4, wherein back EMFs ($e'_\gamma$, $e'_\delta$) output from the back EMF observer is calculated by the following equation:

$$e'_\gamma = -\sqrt{A^2 + B^2} \sin(\Delta\theta + \zeta)$$
$$e'_\delta = \sqrt{A^2 + B^2} \cos(\Delta\theta + \zeta)$$ , $\Delta\theta + \zeta = \tan^{-1}\left(\frac{-e'_\gamma}{e'_\delta}\right)$ -continued $$\zeta = \tan^{-1}\left(\frac{B}{A}\right)$$

$$A = E_{ex} + \frac{\omega_e^2 L_d L_q}{R_i} i_q \quad 5$$

$$B = -\frac{\omega_e^2 L_q(\psi m + L_d i_d)}{R_i}.$$

6. The sensorless control method of claim 5, wherein an electrical angle used to compensate the electrical angle error is obtained through simulation or experiment for the motor.

7. A non-transitory computer readable medium containing program instructions executed by a controller, the computer readable medium comprising:
   program instructions that control a back electromotive force (EMF) observer to estimate a back EMF of the motor using the back EMF observer;
   program instructions that calculate an electrical angle error considering iron loss of the motor based on the estimated back EMF; and
   program instructions that compensate the calculated electrical angle error;
   program instructions that input the compensated electrical angle error to the PLL controller to estimate an actual angle by reducing the error angle due to the iron loss in the PLL controller, and to operate the motor based on the estimated actual angle, wherein voltages ($v_\gamma$, $v_\delta$) of the motor associated with the electrical angle error ($\zeta$) considering the iron loss is calculated by the following equation $$\begin{bmatrix} v_\gamma \\ v_\delta \end{bmatrix} = \begin{bmatrix} R_s + pL_d & -\omega_e L_q \\ \omega_e L_q & R_s + pL_d \end{bmatrix} \begin{bmatrix} i_\gamma \\ i_\delta \end{bmatrix} + \begin{bmatrix} -\sqrt{A^2 + B^2} \sin(\Delta\theta + \zeta) \\ \sqrt{A^2 + B^2} \cos(\Delta\theta + \zeta) \end{bmatrix}$$

$$\zeta = \tan^{-1}\left(\frac{B}{A}\right)$$

$$A = E_{ex} + \frac{\omega_e^2 L_d L_q}{R_i} i_q$$

$$B = -\frac{\omega_e^2 L_q(\psi m + L_d i_d)}{R_i}$$

wherein d, q: accurate d, q-axis; $\omega_e$: electric angular velocity of motor; $i_d$: d-axis current; $i_q$: q-axis current; $i_{di}$: d-axis iron loss current; $i_{qi}$: q-axis iron loss current; $i_{dm}$: d-axis magnetizing current; $i_{qm}$: q-axis magnetizing current; $v_d$: d-axis voltage; $v_q$: q-axis voltage; $R_s$: stator phase resistance; $R_i$: Iron loss equivalent resistance; $L_d$: d-axis inductance; $L_q$: q-axis inductance; $\psi_m$: permanent magnet flux constant; $P_{iron}$: Iron loss; $P_h$: hysteresis loss; and $P_{ed}$: eddy-current loss.

* * * * *